(No Model.) 3 Sheets—Sheet 1.

G. W. CRAIG.
WEIGHING SCALES.

No. 416,399. Patented Dec. 3, 1889.

WITNESSES:
Fred G. Dieterich
P. B. Turpin

INVENTOR:
George W. Craig.
BY
ATTORNEYS.

(No Model.) 3 Sheets—Sheet 2.
G. W. CRAIG.
WEIGHING SCALES.
No. 416,399. Patented Dec. 3, 1889.
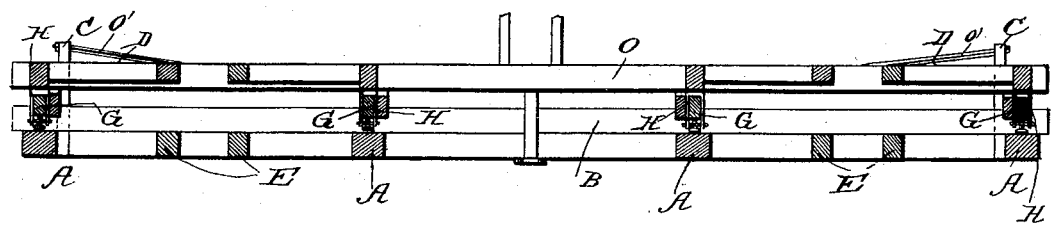
Fig. 4.
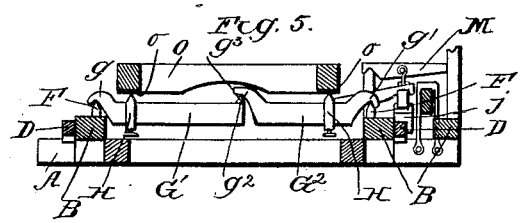
Fig. 5.
Fig. 8.
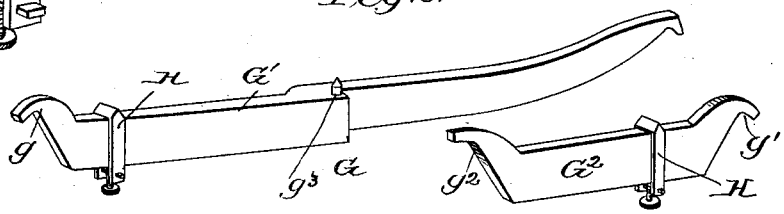
Fig. 6.
WITNESSES:
Fred G. Dieterich
P. B. Turpin
INVENTOR:
George W. Craig.
BY Munn & Co
ATTORNEYS.

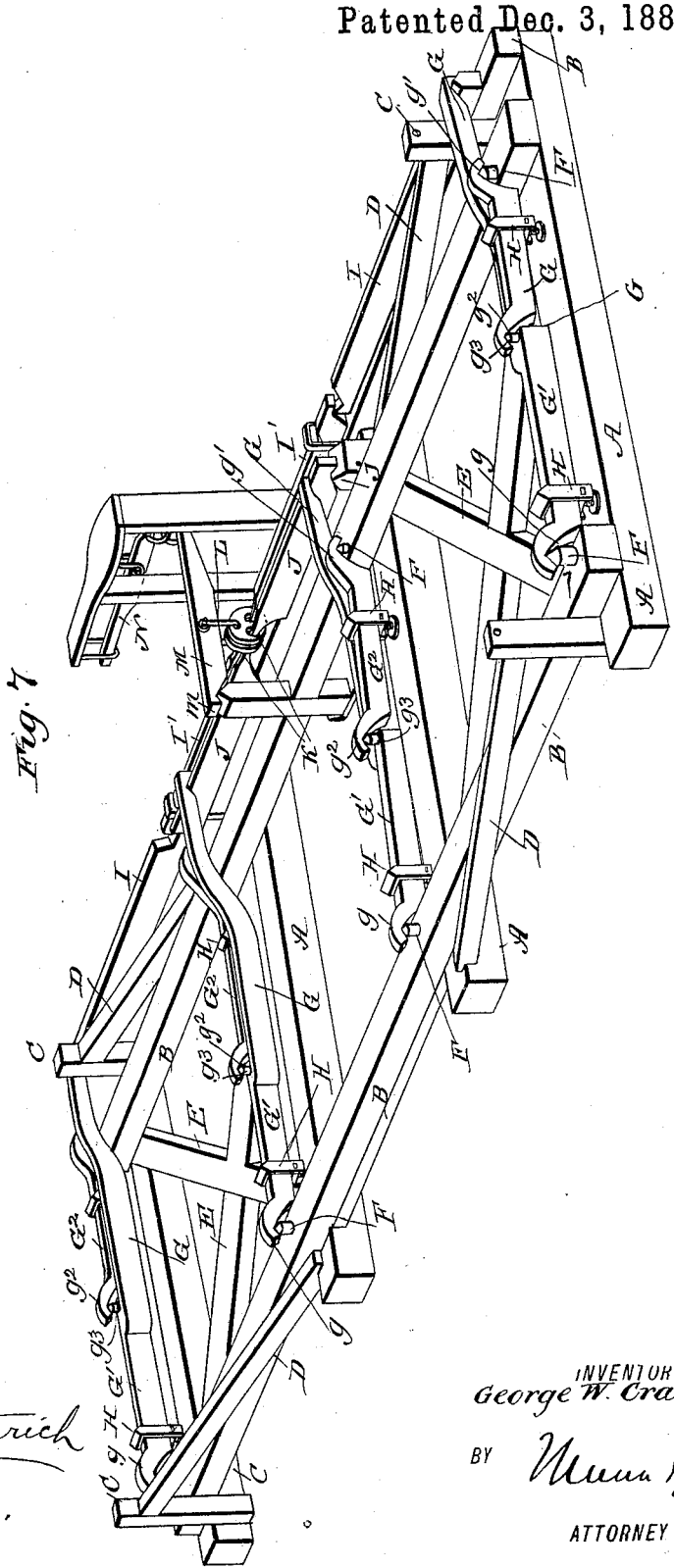

UNITED STATES PATENT OFFICE.

GEORGE W. CRAIG, OF CHARLESTON, WEST VIRGINIA.

WEIGHING-SCALES.

SPECIFICATION forming part of Letters Patent No. 416,399, dated December 3, 1889.

Application filed February 11, 1889. Serial No. 299,430. (No model.)

*To all whom it may concern:*

Be it known that I, GEORGE W. CRAIG, of Charleston, in the county of Kanawha and State of West Virginia, have invented a new and useful Improvement in Weighing-Scales, of which the following is a specification.

My invention is an improvement in weighing-scales, and particularly in scales intended for use in weighing railway-cars, locomotives, heavy wagons, and other large heavy bodies.

The invention consists in the improved constructions and combinations of parts, as will be hereinafter described, and pointed out in the claims.

In the drawings, Figure 1 is a perspective view of my improved scales. Fig. 2 is a detail view of the main frame with the levers, &c., in place, the weighing platform or frame being removed. Fig. 3 is a detail perspective view of the weighing or platform frame inverted. Fig. 4 is a vertical longitudinal section of the scales. Fig. 5 is a cross-section thereof. Fig. 6 is a detail view of the sectional lever. Fig. 7 is an enlarged perspective view of the main frame with the levers, &c., in place, the weighing platform or frame being removed; and Fig. 8 is a detail view of the clevis or loop-like seat or bearing.

The main frame supporting the weighing mechanism is formed with base-sills A and side sills B, suitably united to form a rectangular frame, at the corners of which rise short uprights or standards C, braced by strut-braces D. Suitable diagonal braces E are also provided between the base-sills A, the whole forming a firm rigid main frame. On the side sills B, I support the edge rests or bearings F for the platform-levers G, such levers being arranged crosswise of the main frame, and the bearings F being arranged directly, or nearly so, opposite each other, as shown.

The platform-levers G, of which I use several, as shown, are all alike or similar, and each consists of two sections, $G'$ $G^2$, the former being the main section and being arranged to rest at one end $g$ on one of the bearings F, and to extend thence to the opposite side of the main frame, and being engaged at its opposite end with the side or intermediate levers presently described. The said main section $G'$, therefore, is fulcrumed at one end at one side of the main frame and extends thence to the opposite side of the said main frame.

Near its fulcrumed end the section $G'$ is provided with a seat H for the weighing or platform frame, the said seat being shown as a loop or clevis. Such seat is edged or pointed at its upper end, and is formed with depending arms which fit on opposite sides of and extend below the lever-section, and is provided at its lower end with a clamp consisting, in the construction shown, of a set-screw by which the seat may be secured in any suitable adjustment along the section to regulate weights or weighing.

The section $G^2$ is made shorter than the section $G'$, and is fulcrumed at its outer end at $g'$ on the bearing F on the side beam next the side levers, and bears at its inner end at $g^2$ on the section $G'$, at a point about midway between the ends of such section. To provide this bearing, it is preferred to form the section $G'$ at such point with a slight offset or lateral bend, and arrange the section $G^2$ to bear on a fulcrum $g^3$ on the section $G'$ at such bend. The section $G^2$ is provided between its ends with a seat H of the construction before described.

It will be seen that I provide two end levers G and two or more inner levers G between the said end levers. For convenience of reference the levers G may be referred to as the "end" or "outer" levers G and the "inner" levers G. I also employ at one side of the weighing-scales side levers I, I', and J. The levers I are those nearest the ends of the main frame, are pivoted between their ends, and have their outer arms engaged by the end levers G in such manner that the depression of such end levers will effect a depression of the outer ends of the levers I and a consequent elevation of their opposite or inner ends. At their inner ends the levers I engage the outer ends of levers I', so as to elevate such ends and depress the opposite ends of the levers I', which ends are arranged near together, as shown.

The side levers J are pivoted or fulcrumed at their outer ends, at $j$, and are engaged near such end by the inner levers G in such manner that the depression of such inner levers G will effect a depression of levers J at their inner ends. At their said inner ends the levers J extend adjacent to the inner ends of the levers I', and the levers J I' on opposite sides of the lever M (presently described) each project at their inner ends within rings or loops K, which connect with a single stirrup L on a lever M, fulcrumed at $m$, which lever M is in turn connected with the scale-beam N, it may be, by a direct connection, as shown, or by intermediate connections—such, for instance, as a combination of levers—when it is desired to arrange the scale-beam at any desired distance from the platform-frame O. This platform-frame has on its under side steel or other suitable bearings $o$ to rest on the knife-edge rests or bearings H.

The frame O is braced by stay or suspension rods O', extended therefrom to the uprights C, such rods serving to prevent lateral displacement of the platform-frame and at the same time permitting the vertical movement of the frame O incident to the weighing operation. This frame O may be floored over; or, where desired, tracks may be laid directly thereon.

Manifestly the scale-beam N may be of any suitable construction, and needs no detailed description in this application.

Having thus described my invention, what I claim as new is—

1. In weighing-scales, the combination of the main frame, the weighing-frame, the scale-beam, the side levers, connections between said side levers and the scale-beam, and the platform-levers formed of sections G' G², the outer ends of the sections G' being arranged to bear upon the side levers, substantially as and for the purposes set forth.

2. In weighing-scales, the combination, with the main frame, the weighing-frame, the platform-levers, and the scale-beam, of the side or connecting levers, and a series of levers between the side levers and the scale-beam, whereby the scale-beam may be arranged any desired distance from the platform, substantially as set forth.

3. In weighing-scales, the combination of the main frame, the weighing-frame, the platform-levers formed of section G', fulcrumed at one end, the section G², fulcrumed at its outer end and bearing at its inner end on the section G' at a point about midway the ends of the latter, seats on the said sections for bearing by the weighing-frame, and the side or connecting levers engaged by the ends of sections G' opposite their fulcrumed ends and adapted to transmit the motion of the platform-levers to the scale-beam, substantially as set forth.

4. In weighing-scales, the combination, with the main frame, the weighing-frame, the scale-beam or scale proper, and connections for transmitting the motion of the platform-levers to such scale proper, of the platform-levers formed of sections G' and G², the sections G' being fulcrumed at one end and engaged at their opposite ends with the connections, and the sections G² being pivoted at their outer ends and engaged at their inner ends with the sections G' at about the center of the latter, substantially as set forth.

5. In weighing-scales, the combination, with the platform-lever, of the seats thereon, such seats having their upper ends edged or pointed and being provided with depending arms or portions lapping on opposite sides of and extending below the said levers and clamps for securing the said seats in position, substantially as set forth.

6. In weighing-scales, a platform-lever, substantially as described, formed of two sections, one of which is formed approximately midway between its ends with a lateral bend or offset, and is provided on such offset with a bearing $g^3$, and the other section being arranged at one end to engage such bearing $g^3$, said sections being independently pivoted or fulcrumed, substantially as set forth.

7. In weighing-scales, the combination of the main frame, the end platform-levers, the intermediate platform-levers, the platform-frame, the side levers I, I', and J, the scale-beam or scale proper, and connections between the same and the levers I, I', and J, all substantially as and for the purposes specified.

GEORGE W. CRAIG.

Witnesses:
JOHN MEADOWS,
M. D. NAYLOR.